United States Patent
Tetzlaff et al.

(10) Patent No.: US 9,726,166 B2
(45) Date of Patent: Aug. 8, 2017

(54) MAGNETIC ROTATIONAL TO LINEAR ACTUATOR FOR WELL PUMPS

(71) Applicant: Baker Hughes Incorporated, Houston, TX (US)

(72) Inventors: Steven K. Tetzlaff, Owasso, OK (US); Peter F. Lawson, Tulsa, OK (US); Kevin R. Bierig, Tulsa, OK (US); Lance T. Robinson, Tulsa, OK (US); Sean A. Cain, Owasso, OK (US)

(73) Assignee: Baker Hughes Incorporated, Houston, TX (US)

(*) Notice: Subject to any disclaimer, the term of this patent is extended or adjusted under 35 U.S.C. 154(b) by 251 days.

(21) Appl. No.: 14/566,379

(22) Filed: Dec. 10, 2014

(65) Prior Publication Data

US 2016/0169215 A1    Jun. 16, 2016

(51) Int. Cl.
*F04B 47/06* (2006.01)
*F04B 17/03* (2006.01)
(Continued)

(52) U.S. Cl.
CPC ............ *F04B 47/06* (2013.01); *E21B 43/128* (2013.01); *F04B 9/047* (2013.01); *F04B 17/03* (2013.01); *H02K 7/06* (2013.01)

(58) Field of Classification Search
CPC .......... F04B 17/03; F04B 47/00; F04B 47/06; F04B 9/02; F04B 9/047; E21B 43/128; H02K 7/06
(Continued)

(56) References Cited

U.S. PATENT DOCUMENTS

| 4,272,226 A | 6/1981 | Osborne |
| 4,687,054 A | 8/1987 | Russell et al. |

(Continued)

FOREIGN PATENT DOCUMENTS

| GB | 2037364 A | 7/1980 |
| GB | 2037364 B | 10/1982 |

OTHER PUBLICATIONS

Reciprocating Submersible Pump Improves Oil Production, JPT—Jul. 2012—www.jptonline.org.
(Continued)

*Primary Examiner* — Theodore Stigell
*Assistant Examiner* — Chirag Jariwala
(74) *Attorney, Agent, or Firm* — Bracewell LLP; James E. Bradley (57) ABSTRACT

A well pump includes a plunger reciprocally carried within a barrel between up stroke and down stroke positions. A tubular linear actuator housing located below the barrel has a rotatable rotor. An array of rotor magnets is mounted to the rotor, directing rotor magnetic fields in an outward direction. A cage is fixed against rotation relative to the housing and carried within the housing for axial movement relative to the rotor and the housing. The cage has a cylindrical inner sidewall surrounding the outer sidewall of the rotor. An array of cage magnets is mounted to the inner sidewall of the cage. The cage magnets direct cage magnetic fields in an inward direction relative to the axis. The cage and rotor magnetic fields interact such rotation of the rotor causes axial movement of the cage. A motor rotates the rotor.

20 Claims, 5 Drawing Sheets

(51) Int. Cl.
*E21B 43/12* (2006.01)
*H02K 7/06* (2006.01)
*F04B 9/04* (2006.01)

(58) Field of Classification Search
USPC ............ 417/12; 310/80, 87, 103, 104, 12.14
See application file for complete search history.

(56) References Cited

U.S. PATENT DOCUMENTS

| | | | |
|---|---|---|---|
| 5,734,209 A | 3/1998 | Hallidy | |
| 5,751,083 A * | 5/1998 | Tamura | H02K 49/102 |
| | | | 310/80 |
| 5,831,353 A | 11/1998 | Bolding et al. | |
| 6,015,270 A | 1/2000 | Roth | |
| 6,084,326 A * | 7/2000 | Nagai | F16H 25/2418 |
| | | | 310/103 |
| 6,155,792 A * | 12/2000 | Hartley | F04B 47/06 |
| | | | 165/119 |
| 6,201,327 B1 * | 3/2001 | Rivas | F04D 13/062 |
| | | | 310/87 |
| 6,283,720 B1 | 9/2001 | Kottke | |
| 6,497,281 B2 * | 12/2002 | Vann | E21B 43/126 |
| | | | 166/105 |
| 6,926,504 B2 | 8/2005 | Howard | |
| 7,445,435 B2 | 11/2008 | Howard | |
| 7,971,650 B2 * | 7/2011 | Yuratich | E21B 43/128 |
| | | | 166/105 |
| 8,567,042 B2 * | 10/2013 | Neuroth | F16C 17/04 |
| | | | 29/428 |
| 9,085,970 B2 * | 7/2015 | Xiao | F17D 3/00 |
| 9,124,167 B2 * | 9/2015 | Rodger | H02K 7/06 |
| 2005/0042111 A1 * | 2/2005 | Zaiser | F04B 9/02 |
| | | | 417/225 |
| 2011/0271867 A1 * | 11/2011 | Liu | B60L 13/003 |
| | | | 104/130.02 |
| 2013/0264902 A1 * | 10/2013 | Wilson | H02K 7/06 |
| | | | 310/80 |
| 2014/0105759 A1 * | 4/2014 | Henry | F04B 47/02 |
| | | | 417/53 |
| 2015/0231942 A1 * | 8/2015 | Trangbaek | F16F 15/03 |
| | | | 267/195 |
| 2016/0123123 A1 * | 5/2016 | Maclean | E21B 43/128 |
| | | | 166/372 |

OTHER PUBLICATIONS

Analytical Design of Permanent Magnet Radial Couplings, Romain Ravaud, Valerie Lemarquand and Guy Lemarquand, IEEE Transactions on Magnetics, vol. 46, No. 11, Nov. 2010, pp. 3860-3865.
Submerged Pumps and Expanders with Magnetic Coupling for Hazardous Applications, Vinod Patel and Steve Rush, Proceedings of the First Middle East Turbomachinery Symposium, Feb. 13-16, 2011, Doha, Qatar, pp. 1-8.
Torque Analysis and Measurements of Cylindrical Air-Gap Synchronous Permanent Magnet Couplings Based on Analytical Magnetic Field Calculations, Jang-Young Choi, Hyeon-Jae Shin, Seek-Myeong Jang, and Sung-Ho Lee, IEEE Transactions on Magnetics, vol. 49, No. 7, Jul. 2013, pp. 3921-3924.

* cited by examiner

MAGNETIC ROTATIONAL TO LINEAR ACTUATOR FOR WELL PUMPS

FIELD OF THE DISCLOSURE

This disclosure relates in general to linear actuator driven reciprocating well pumps and in particular to a linear actuator that has a rotating member with a magnet array that causes a nonrotating member with a magnet array of similar polarity to move linearly to stroke the reciprocating pump.

BACKGROUND

Reciprocating pumps are often employed to produce many oil wells. Typically, the pump comprises a plunger with valves that strokes within a barrel at the lower end of a string of production tubing. A string of sucker rods extends from the plunger to a lifting mechanism at the surface. The lifting mechanism strokes the rods to move the plunger in an up stroke and a down stroke.

Some wells have inclined and even horizontal lower portions. The inclined portion connects to a vertical portion of the well at a bend. Placing the pump within the inclined section of the well can present problems. The upward and downward movement of sucker rods at the bend in the tubing creates wear on the rods as well as the tubing.

Another common type of pump is an electrical submersible pump. This type of pump has a motor, normally electric, coupled to the pump. Electrical power may be supplied over a power cable that is strapped alongside the production tubing. The pump is normally a rotary type, such as a centrifugal pump or a progressing cavity pump. Electrical submersible pumps can be installed in an inclined section of a well as there will be no reciprocating movement of any of the components. Generally, an electrical submersible pump is more expensive than a reciprocating type pump for the same well.

SUMMARY

A reciprocating well pump assembly includes a barrel having an axis. A plunger is reciprocally carried within the barrel between up stroke and down stroke positions. A tubular linear actuator housing has a rotating member mounted in the housing for rotation about the axis relative to the housing. An array of rotating member magnets is mounted to the rotating member. A nonrotating member is fixed against rotation relative to the housing and carried within the housing for axial movement relative to the rotating member and the housing. The nonrotating member is cooperatively engaged with the plunger so that axial movement of the nonrotating member strokes the plunger;

An array of nonrotating member magnets is mounted to the nonrotating member. The nonrotating member magnets have magnetic fields that interact with magnetic fields of the rotating member magnets such that rotation of the rotating member causes axial movement of the nonrotating member. A motor is cooperatively engaged with the rotating member for rotating the rotating member.

Magnetic fields of the rotating member magnets are directed outward relative to the axis. Magnetic fields of the nonrotating member magnets are directed inward relative to the axis Preferably, the nonrotating member surrounds the rotating member. A connector member extends axially from the nonrotating member past the rotating member for axial movement in unison with the nonrotating member. A rod is secured to the connector member on an end opposite the nonrotating member and extends axially into engagement with the plunger for causing the plunger to stroke in unison with the nonrotating member.

The array of rotating member magnets extends along a helical line along the rotating member. The array of nonrotating member magnets extends along a helical line along the nonrotating member. Preferably, the rotating member helical line has multiple turns encircling an outer sidewall of the rotating member. The turns of the rotating member helical line are spaced apart from each other by a selected rotating member magnet pitch. The array of nonrotating member magnets extends along a nonrotating member helical line along an inner sidewall of the nonrotating member. The nonrotating member helical line has multiple turns encircling the inner sidewall. The turns of the nonrotating member helical line are spaced apart from each other by a nonrotating member magnet pitch that is the same as the rotating member magnet pitch.

The rotating member magnets and the nonrotating member magnets comprise permanent magnets. The array of nonrotating member magnets has an axial length that is less than an axial length of the array of rotating member magnets. A reversing means reverses a direction of the motor and the rotating member at a top of the up stroke and at a bottom of the down stroke of the plunger.

BRIEF DESCRIPTION OF THE DRAWINGS

So that the manner in which the features, advantages and objects of the disclosure, as well as others which will become apparent, are attained and can be understood in more detail, more particular description of the disclosure briefly summarized above may be had by reference to the embodiment thereof which is illustrated in the appended drawings, which drawings form a part of this specification. It is to be noted, however, that the drawings illustrate only a preferred embodiment of the disclosure and is therefore not to be considered limiting of its scope as the disclosure may admit to other equally effective embodiments.

DETAILED DESCRIPTION OF THE DISCLOSURE

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figures 1A, 1B:
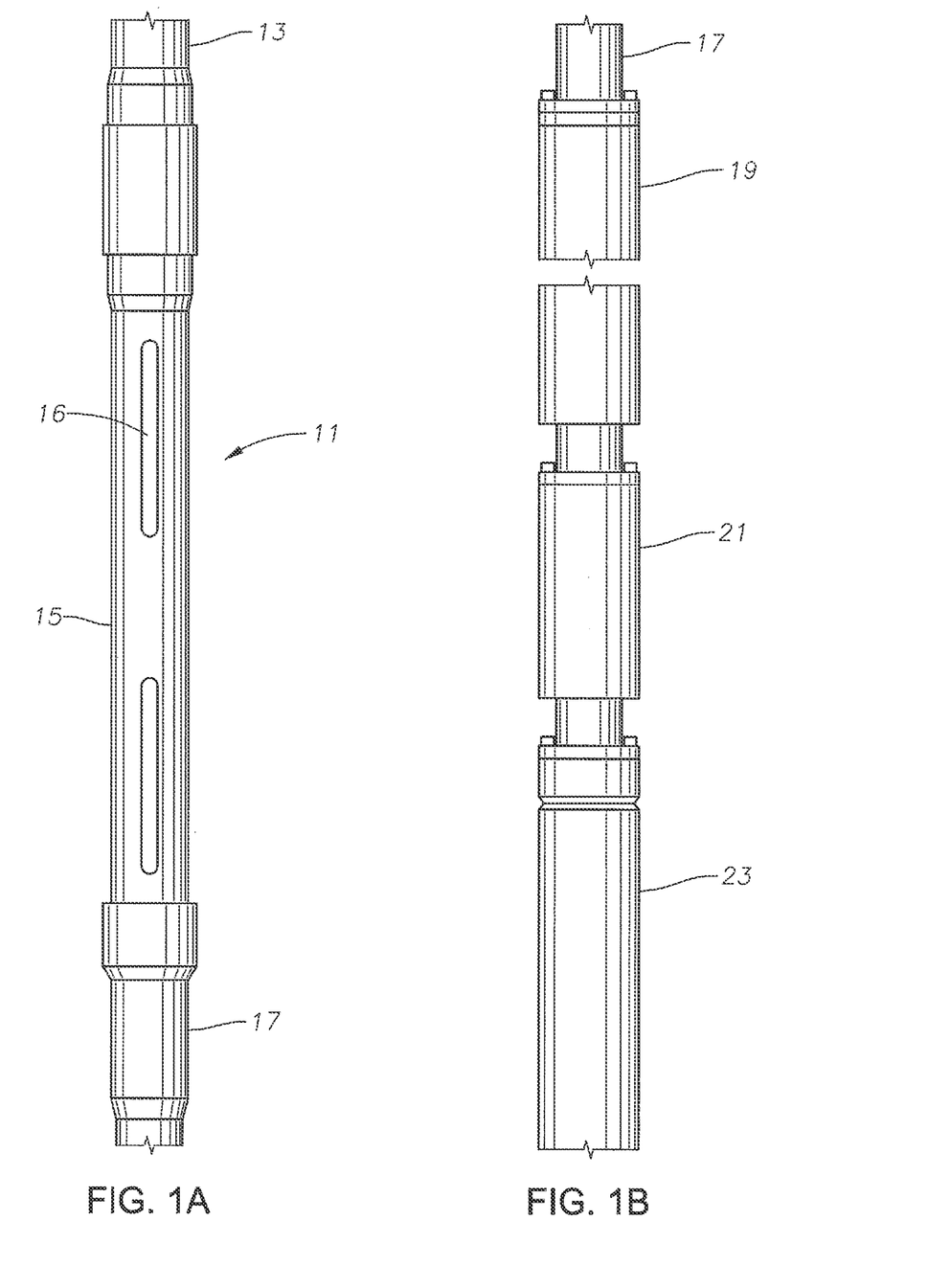
FIGS. 1A and 1B comprise a side view of a pump assembly in accordance with this disclosure.

Referring to FIG. 1A, a well pump assembly 11 is illustrated suspended on a string of production tubing 13. In this example, well pump assembly 11 includes a tubular sub 15 with inlet ports 16. Sub 15, which may be considered to be a part of production tubing 13, secures by threads to the lower end of production tubing 13. Pump assembly 11 may be used in inclined and horizontal wells, thus the terms "upper" and "lower" are used only for convenience and not in a limiting manner. A tubular landing receptacle 17 secures by threads to the lower end of sub 15.

Referring to FIG. 1B, in this example, landing receptacle 17 secures to the upper end of a seal or pressure equalizing section 19. A gear reducer 21 optionally secures to the lower end of seal section 19. An electrical motor 23 secures to the lower end of gear reducer 21. A sensing unit (not shown) optionally may be attached to the lower end of motor 23 to provide readings of pressure, temperature, and other parameters. A power cable (not shown in FIGS. 1A, 1B) will extend alongside tubing 13 from a wellhead at the top of the well to provide power to motor 23. Gear reducer 21, if employed, has an output shaft that rotates at a slower speed than the shaft within motor 23. Seal section 19 reduces a pressure difference between dielectric lubricant in motor 23 and the hydrostatic pressure of the well fluid.

Figure 2A:
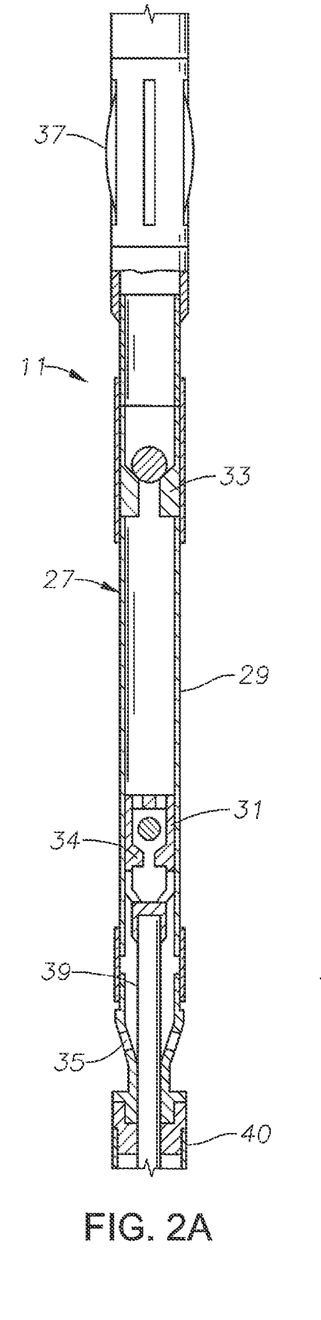
FIGS. 2A, 2B and 2C comprise a sectional view of an inner part of the pump assembly of FIGS. 1A and 1B.
Figure 2B:
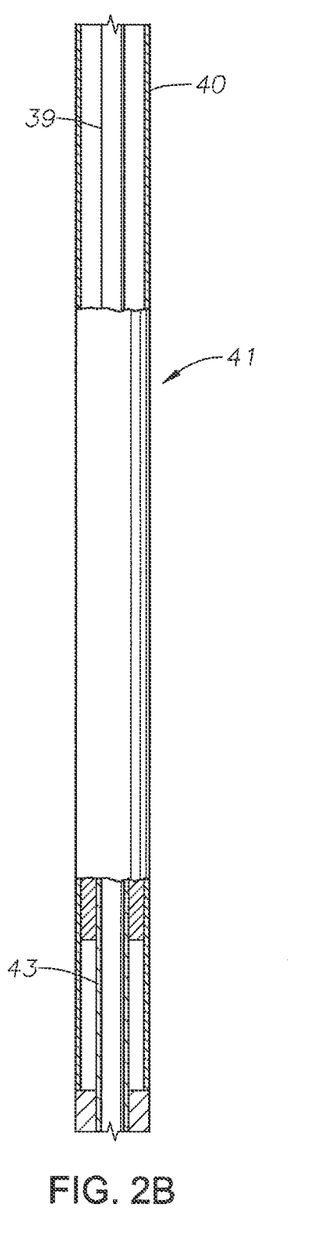
Figure 2C:
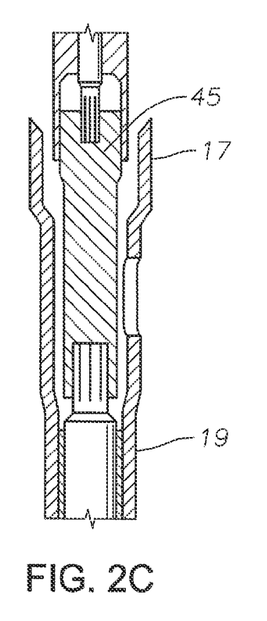

FIGS. 2A-2C show the components normally located within sub 15, which has been removed from these figures for clarity. Referring to FIG. 2A, pump 27 has a barrel 29, a travelling valve 31, a standing valve 33, and a plunger 34, all of which are shown schematically. Standing valve 33 secures to the upper end of barrel 29, and travelling valve 31 secures to plunger 34 for axial movement within barrel 29 between an up stroke and a down stroke. An intake 35 located in barrel 29 below plunger 34 admits well fluid into barrel 29. During the down stroke, the well fluid flows through travelling valve 31 as travelling valve 31 moves downward. During the down stroke, standing valve 33 is closed, preventing well fluid in production tubing 13 from flowing downward past standing valve 33. During the up stroke, travelling valve 31 closes, causing the upward movement of plunger 34 to push the well fluid above plunger 34 upward through standing valve 33, thereby lifting the column of well fluid in production tubing 13 an increment. At the top of the stroke, standing valve 33 closes.

In this embodiment, a landing collar 37 on the upper end of pump 27 frictionally engages the interior of production tubing 13 (FIG. 1A) to resist movement of pump 27 once installed within tubing 13. An axially reciprocating rod 39 extending downward from plunger 34 strokes plunger 34. Referring to FIG. 2B, reciprocating rod 39 is located within a tubular housing 40 that also contains a reversing linear actuator 41 for reciprocating rod 39. Linear actuator 41 is engaged on its lower end by a rotating drive shaft 43, which is rotated by motor 23. Linear actuator 41 transforms the rotating movement of drive shaft 43 into axial movement of rod 39. Referring to FIG. 2C, a stabbing guide 45 on the lower end of rotating drive shaft 43 stabs into the drive shaft extending through seal section 19 within landing receptacle 17.

In this example, motor 23, gear reducer 21, and seal section 19 (FIG. 1B) are secured to a lower end of landing receptacle 17, which in turn has an upper end secured to sub 15 of production tubing 13; thus motor 23, gear reducer 21 and seal section 19 are lowered into the well along with and at the lower end of production tubing 13. Pump 27, linear actuator 41, and rotating drive shaft 43, are lowered through production tubing 13 into sub 15 after production tubing 13 has been installed. Rotating drive shaft 43 stabs into engagement with the rotating drive shaft of seal section 19.

Alternately, rather than being installed within tubing 13, pump 27, linear actuator 41 and rotating drive shaft 43 could be mounted below the lower end of production tubing 13, along with motor 23, gear reducer 21 and seal section 19. Also, seal section 19, gear reducer 21 and motor 23 could be lowered through tubing 13, rather than secured to the lower end of tubing 13.

Figure 3:
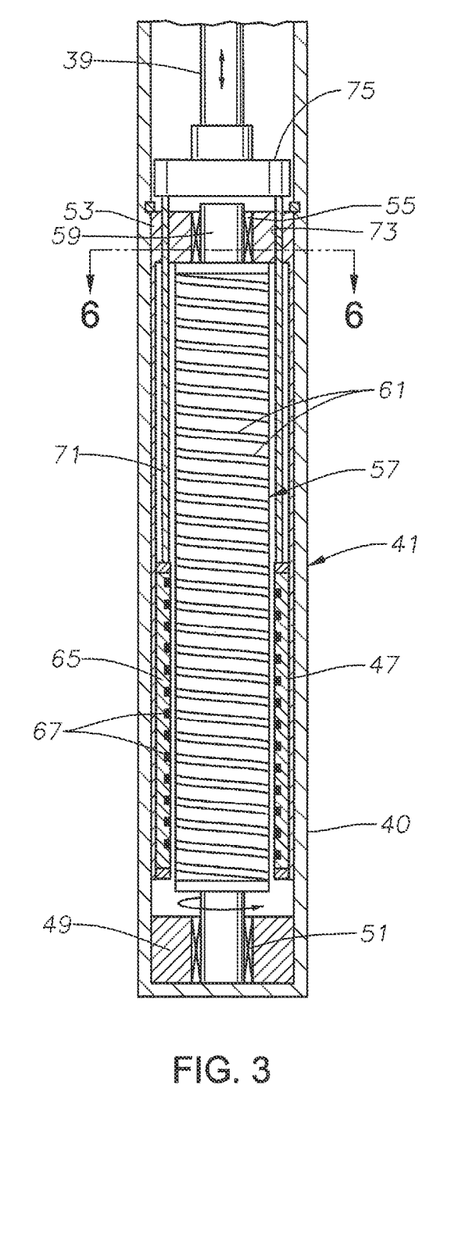
FIG. 3 is an enlarged sectional view of the linear actuator of the assembly of FIG. 2B.

Referring to FIG. 3, in this embodiment, linear actuator 41 includes a cylindrical liner 47 secured against rotation and axial movement within housing 40. Liner 47 is preferably formed of a non-magnetic material. A lower bearing carrier 49 is secured in housing 40 below or at the lower end of liner 47. Lower bearing carrier 49 supports a lower bearing 51, which may comprise a sleeve. An upper bearing carrier 53 is secured in housing 40 above or at the upper end of liner 47. Upper bearing carrier 53 supports an upper bearing 55, which also may be a sleeve. Lower and upper bearing carriers 49, 53 support a rotor 57 for rotation within housing 40. Rotor 57 is a rotating member that has a rotor shaft 59 that mounts in lower bearing 51 and in upper bearing 55. Lower and upper bearing carriers 49, 53 prevent any axial movement of rotor 57 relative to the longitudinal axis of housing 40. Rotor shaft 59 extends downward into engagement with the drive shaft in seal section 19.

Figure 4:
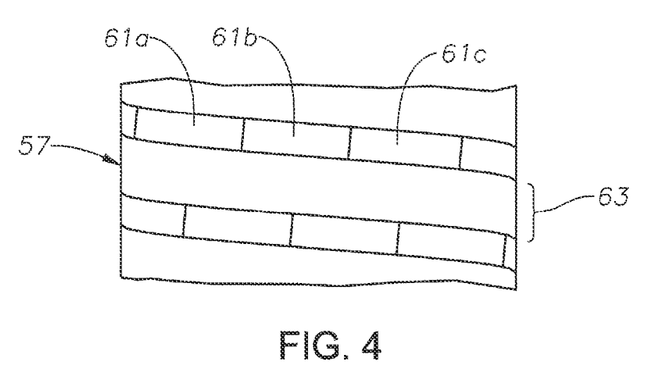
FIG. 4 is a fragmentary, enlarged side view of part of the rotating member of the linear actuator of FIG. 3.

Rotor 57 has a cylindrical outer sidewall containing a plurality of rare earth permanent magnets 61 that rotate with rotor 57. Rotor magnets 61 are arrayed in a helical line that extends around rotor 57 many times from the lower to the upper end of rotor 57. The individual rotor magnets 61 are mounted along the helical line and may abut each other, as indicated by the numerals 61a, 61b and 61c of FIG. 4. Preferably, there is only one continuous helical line for rotor magnets 61. Each turn of the helical line is spaced from adjacent turns by a selected pitch 63. The magnetic fields of rotor magnets 61 are directed radially outward from the longitudinal axis.

Figure 8:
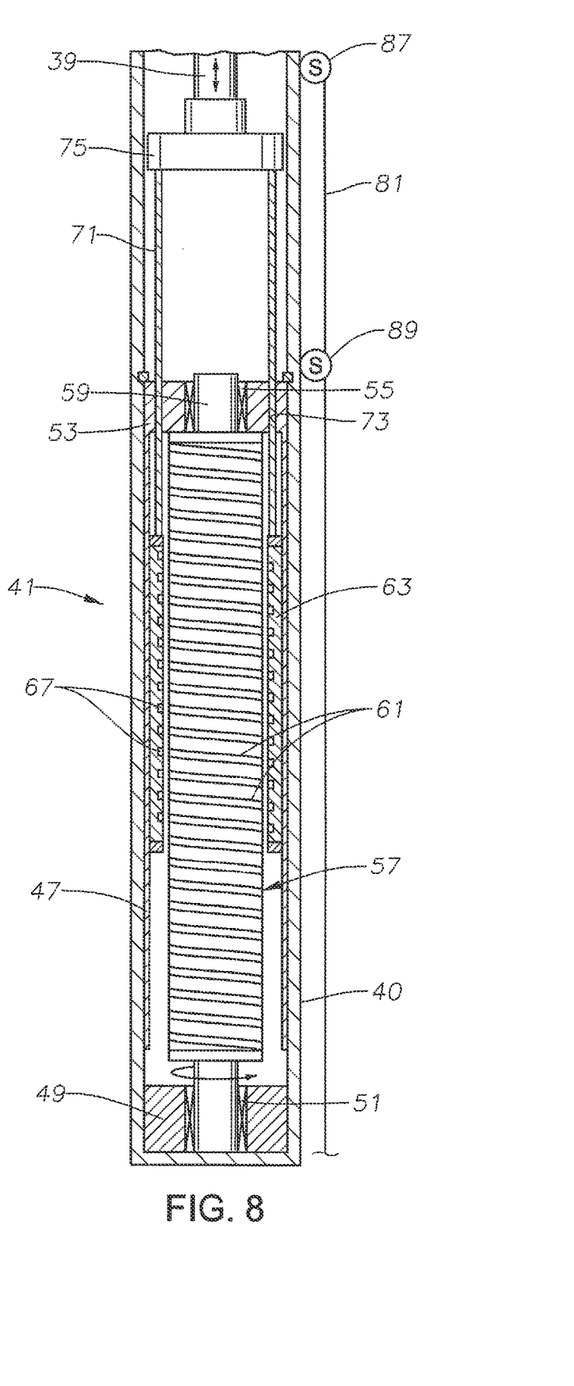
FIG. 8 is a sectional view of an alternate embodiment of the linear actuator of FIG. 3, and showing the stator at an elevated position compared to the position in FIG. 3.

A cage 65, which may also be called a stator, locates within liner 47 and surrounds rotor 57. Cage 65 is a non rotating member restrained by a key and keyway or the like from rotation relative to liner 47 and housing 40. However, cage 65 is free to move axially from a lower position to an upper position. In the lower position, a lower end of cage 65 is near or at the bottom of rotor 57. In the upper position, an upper end of cage 65 is near or at the upper end of rotor 57. FIG. 8 shows cage 65 upward from the position shown in FIG. 3.

Figure 5:
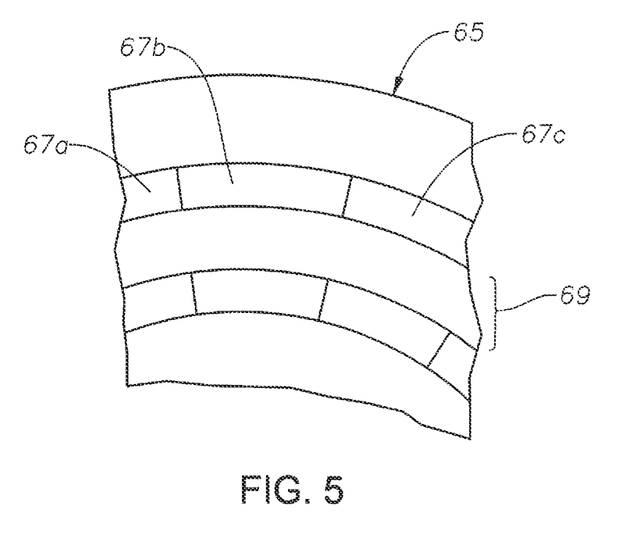
FIG. 5 is a fragmentary, enlarged perspective view of the stator of the linear actuator of FIG. 3.

Cage 65 is a cylindrical member with a bore or inner sidewall containing a plurality of rare earth permanent cage magnets 67. Cage magnets 67 are fixed to cage 65, thus do not rotate but move axially between lower and upper positions. Cage magnets 67 are arrayed in a helical line that extends around the inner sidewall of cage 65 many times from the lower to the upper end of cage 65. The individual cage magnets 67 are mounted along the helical line and may abut each other, as indicated by the numerals 67a, 67b and 67c of FIG. 5. Preferably, there is only one continuous helical line for cage magnets 67. Each turn of the cage helical line is spaced from adjacent turns by a selected pitch 69 that is preferably equal to pitch 63 of rotor magnets 61. Cage magnets 67 are spaced a small annular clearance from rotor magnets 61.

The magnetic fields of cage magnets 67 are directed radially inward toward the longitudinal axis. Rotor magnets 61 and cage magnets 67 may either be attracted to one another or repulsed from one another. As rotor 57 rotates relative to cage 65, each rotor magnet 61 forms a momentary pair with a cage magnet 67 located 180 degrees or directly across from it. The magnets 61, 67 of the momentary pair should be in an identical state both in direction (repulsion vs attraction) and field strength. If an imbalance existed, creating an asymmetrical disruption in the field, rotor 57 could be forced out of balance or alignment.

The axial length of the portion of cage 65 containing the helical array of cage magnets 67 is less than the axial length of the portion of rotor 57 containing the helical array of rotor magnets 61, preferably about one-half. Consequently, the helical array of cage magnets 67 has half as many turns as the helical array of rotor magnets 61. When cage 65 moves from its lowermost position to its uppermost position, it will travel approximately the length of rotor 57.

Figure 6:
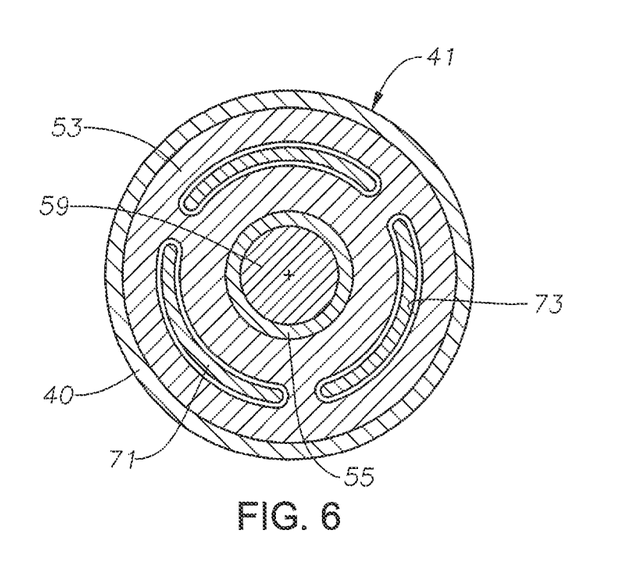
FIG. 6 is a sectional view of the linear actuator of FIG. 3, taken along the line 6-6 of FIG. 3.

At least one connecting member 71 (three shown) is secured to the upper end of cage 65. Connecting members 71 extend slidably through openings 73 in rotor upper bearing carrier 53. A cap 75 above rotor upper bearing carrier 53 connects upper ends of connecting members 71 together. Pump rod 39 has a lower end secured to cap 75. Connecting members 71 are parallel to each other and offset and parallel to the axis of housing 40. As shown in FIG. 6, connecting members 71 may comprise arcuate members that are segments of a sleeve concentric with the axis. Alternately, connecting members 71 may have other cross-sectional shapes, such as individual cylindrical rods. Axial movement of cage 65 causes connecting members 71 and rod 39 to move axially in unison.

In operation, motor 23 (FIG. 1B) rotates rotor 57 and rotor magnets 61. The magnetic fields of rotor magnets 61 and cage magnets 67 either attract or repulse each other, causing turns of the helical array of rotor magnets 61 to axially align with turns of the helical array of cage magnets 67. Each turn of the helical array of rotor magnets 61 will be radially across from a turn of the helical array of cage magnets 67. Since cage 65 does not rotate, the rotation of rotor 57 causes a net upward three to be imposed on cage 65 if the rotation of rotor 57 is in a first direction. If the rotation is in an opposite direction, the force on cage 65 would be downward. An analogy would be rotating a threaded bolt while holding a nut that engages the bolt against rotation. The helical array of rotor magnets 61 and helical array of cage magnets 67 engage each other in a manner somewhat like threads engaging each other. As cage 65 moves upward, the magnetic fields of cage magnets 67 progressively move out of the range of the magnetic fields of rotor magnets 61, which do not move axially. As cage 65 moves upward, it will push rod 39 and plunger 34 upward to lift a column of well fluid.

Near or at the upper end of the stroke, motor 23 reverses direction, which results in a net downward force on cage 65. At the top of the stroke, at least a portion of the magnetic fields of cage magnets 67 will still be interacting with the magnetic fields of rotor magnets 61. Cage 65, rod 39 and plunger 34 then move back downward until near or at the bottom of the stroke. As cage 65 moves downward, more of the magnetic fields of cage magnets 67 begin to interact with the magnetic fields of rotor magnets 61. At the bottom of the down stroke, motor 23 will again reverse direction to repeat the stroking movement.

Different techniques may be employed to reverse the rotation of motor 23 at the end of each stroke. In the embodiment shown, motor 23 (FIG. 1) is a three-phase alternating current electrical motor. Further, motor 23 is a multi-phase motor like a four pole motor, which can run at half speed compared to a three phase frame. Optionally, motor 23 could be a hydraulic motor rather than an electric motor. Motor 23 is capable being repetitively reversed in rotation direction to cause the up stroke and down stroke.

Figure 7:
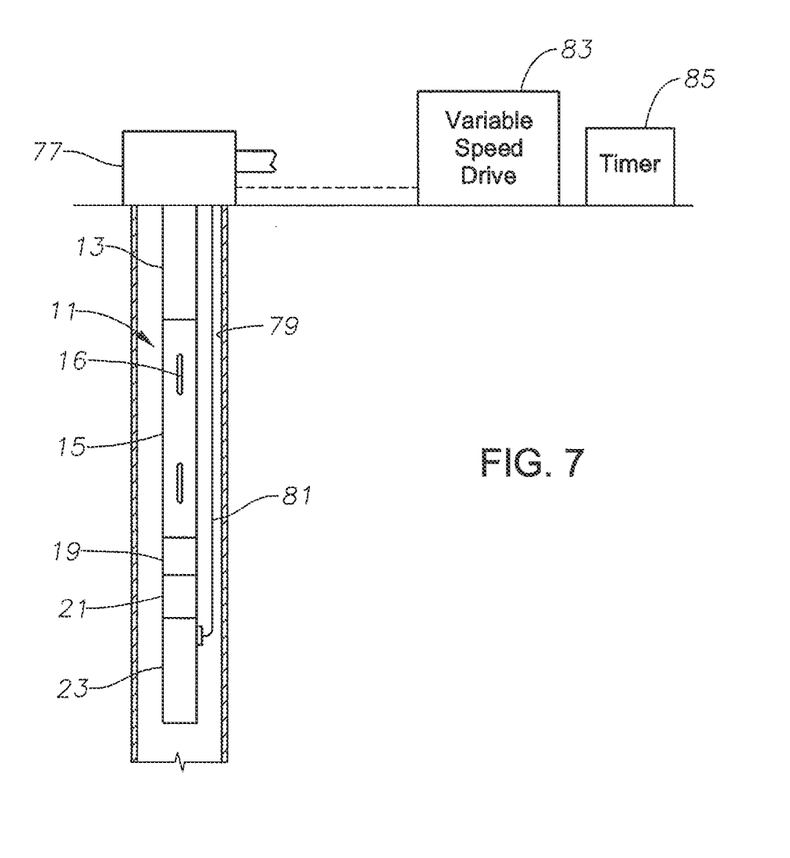
FIG. 7 is a schematic view of the system of FIGS. 2A-2C.

Referring to FIG. 7, a wellhead or tree 77 supports production tubing 13 in a cased well 79. A power cable 81, which normally includes a motor lead, extends alongside tubing 13 to motor 23. A power source, which is preferably a variable speed drive 83, is adjacent tree 77 and connects to power cable 81 to supply electrical power to motor 23. Variable speed drive 83 supplies alternating current at frequencies that can be varied. The higher the frequency, the higher the rotational speed of motor 23. Also, the power supplied by variable speed drive 83 determines the direction of rotation of motor 23. The three conductors of power cable 81 are wound at a selected pattern through the stator of motor 23, and the sequence of each of the three phases determines the direction of rotation. Variable speed drive 83 is configured to change the sequence to reverse the rotation at the top of the stroke and the bottom of the stroke. As an example, if the AC power is supplied to the phases in the order of phase A, phase B and phase C, the rotation of motor 23 is in one direction. If the variable speed drive 83 supplies the power in another order, such as phase B, phase A, phase C, the rotation of motor 23 is in the opposite direction.

In this example, a timer 85 provides a signal to variable speed drive 83 when to reverse the direction of rotation of motor 23. Timer 85, which would be incorporated with variable speed drive 83, can be set for a desired stroke length. The operator empirically determines how many seconds are required to complete movement from the bottom of the stroke to the top, and inputs that value to timer 85. This time value causes axial movement of travelling valve 31 (FIG. 2A from a known point to a second known point. Preferably, variable speed drive 83 will slow the rotation before reversal when nearing the top and bottom of the stroke. Also, variable speed drive 83 will ramp up the rotational speed at a desired rate after each reversal. Although a variable speed drive is preferable, other surface controllers could be fitted with timer type devices.

In a second embodiment, illustrated in FIG. 8, components that are the same as in the first embodiment employ the same reference numerals. A lower sensor 89 at least partially mounted within housing 40 senses when travelling valve 31 is nearing the bottom of the stroke and provides a signal to variable speed drive 83 (FIG. 3) to cause the rotational direction of motor 23 (FIG. 1B) to reverse. An upper sensor 87 senses when travelling valve 31 is nearing an upper end of the upstroke and provides a signal to variable speed drive 83 (FIG. 3), causing the rotational direction of motor 23 to reverse. Variable speed drive 83 will ramp up and down the rotational speed with each reversal. Some variable speed drives have a capability to slow and change direction without actually coming to a complete stop. Sensors 87, 89 are mounted at fixed locations axially apart from each other. A timer, such as timer 85, would not be needed.

Sensors 87, 89 may be mounted in various places to sense the approach of one of the components that moves axially during the strokes. In the example shown, both sensors 87, 89 are mounted within housing 40 to sense the approach of cage cap 75 at the top and bottom of the stroke. Sensor 87 is mounted near the upper end of housing 40 and sensor 89 a distance below that is based on the desired length of the stroke. Sensors 87, 89 may be a variety of types, including proximity sensors using magnets and Hall effect.

Sensors 87, 89 may connected to a separate instrument wire that is a part of power cable 81 leading to the surface. Alternately, the signals from sensors 87, 89 could be superimposed on the three electrical conductors of power cable 81 that supply three-phase power to motor 23 (FIG. 3) and extend alongside linear actuator 41.

While the disclosure has been described in only a few of its forms, it should be apparent to those skilled in the art that various changes may be made. For example, the standing and travelling valves may have a variety of configurations.

The invention claimed is:

1. A reciprocating well pump assembly, comprising:
a barrel having an axis;
a plunger reciprocally carried within the barrel between an up stroke and a down stroke;
a tubular linear actuator housing;
a rotating member having a cylindrical outer sidewall and mounted in the housing for rotation about the axis relative to the housing;
upper and lower bearing carriers rigidly secured to the housing above and below the rotating member, each having a radial bearing that receives an end of the rotating member for radially supporting the rotating member, the upper bearing carrier having a plurality of openings offset from the axis;
an array of rotating member magnets mounted to the outer sidewall of the rotating member;
a nonrotating member between the upper and lower bearing carriers and having a cylindrical inner sidewall surrounding the outer sidewall of the rotating member;
a plurality of connector members mounted to an upper end of the nonrotating member and extending upward through the openings in the upper bearing carrier, the connector members and the openings being engaged with each other to prevent rotation of the nonrotating member relative to the upper bearing carrier and the housing, but allow axial movement of the nonrotating member relative to the upper bearing carrier and the housing;
a plunger connector that connects the plunger to the connector members such that axial movement of the nonrotating member strokes the plunger;
an array of nonrotating member magnets mounted to the inner sidewall of the nonrotating member, the nonrotating member magnets having magnetic fields that interact with magnetic fields of the rotating member magnets such that rotation of the rotating member causes axial movement of the nonrotating member;
a motor cooperatively engaged with the rotating member for rotating the rotating member; and
reversing means for reversing a direction of rotation of the rotating member at a top of the up stroke and at a bottom of the down stroke of the plunger.

2. The assembly according to claim 1, wherein:
the magnetic fields of the rotating member magnets are directed outward relative to the axis; and
the magnetic fields of the nonrotating member magnets are directed inward relative to the axis.

3. The assembly according to claim 1, wherein:
the array of nonrotating member magnets has a lower end that is adjacent a lower end of the array of rotating member magnets while at the bottom of the down stroke, and an upper end that is adjacent an upper end of the array of rotating member magnets while at the top of the up stroke.

4. The assembly according to claim 1, wherein:
each of the connector members has an axial length from the rod connector to the upper end of the nonrotating member that is greater than an axial length of the array of nonrotating member magnets.

5. The assembly according to claim 1, wherein:
the array of rotating member magnets comprises a row of individual rotating member magnets side by side along a helical line along the rotating member; and
the array of nonrotating member magnets comprises a row of individual nonrotating member magnets side by side along a helical line along the nonrotating member.

6. The assembly according to claim 1, wherein:
the array of rotating member magnets extends along a rotating member helical line along the outer sidewall of the rotating member, the rotating member helical line having multiple turns encircling the outer sidewall, the turns of the rotating member helical line being spaced apart from each other by a selected rotating member magnet pitch; and
the array of nonrotating member magnets extends along a nonrotating member helical line along the inner sidewall of the nonrotating member, the nonrotating member helical line having multiple turns encircling the inner sidewall, the turns of the nonrotating member helical line being spaced apart from each other by a nonrotating member magnet pitch that is the same as the rotating member magnet pitch.

7. The assembly according to claim 1, further comprising a controller that supplies power to the motor, and wherein the reversing means comprises:
a timer selected to provide an estimated elapsed time between the bottom of the down stroke to the top of the up stroke and between the top of the up stroke to the bottom of the down stroke, and providing signals to the controller to reverse a direction of the motor.

8. The assembly according to claim 1, wherein:
the array of nonrotating member magnets has an axial length that is less than an axial length of the array of rotating member magnets.

9. The assembly according to claim 1, further comprising:
a controller that supplies power to the motor, and wherein the reversing means comprises:
an up stroke sensor mounted to the assembly that senses when the plunger nears the top of the up stroke;
a down stroke sensor mounted to the assembly that senses when the plunger nears the bottom of the down stroke; and
the up stroke and the down stroke sensors being in electrical communication with the controller to reverse a direction of the power being supplied to the motor upon receipt of a signal from the up stroke sensor and a signal from the down stroke sensor.

10. A reciprocating well pump assembly, comprising:
a barrel having an axis;
a plunger reciprocally carried within the barrel between an up stroke and a down stroke;
a tubular linear actuator housing located below the barrel;
a rotor mounted in the housing for rotation relative to the housing, the rotor having a cylindrical outer sidewall;

upper and lower bearing carriers rigidly secured to the housing above and below the rotating member, each having a radial bearing that receives an end of the rotor for radially supporting the rotor, the upper bearing carrier having a plurality of openings spaced around the axis;

an array of rotor magnets mounted to the outer side wall of the rotor, the rotor magnets directing rotor magnetic fields in an outward direction relative to the axis;

a cage carried within the housing for axial movement relative to the rotor and the housing, the cage having a cylindrical inner sidewall surrounding the outer sidewall of the rotor;

an array of cage magnets mounted to the inner sidewall of the cage and surrounding the rotor magnets, the cage magnets directing cage magnetic fields in an inward direction relative to the axis, the cage and rotor magnetic fields interacting such rotation of the rotor causes axial movement of the cage;

a plurality of connector members mounted to an upper end of the cage and extending upward through the openings in the upper bearing carrier, the connector members engaging the openings to prevent rotation of the cage relative to the upper bearing carrier and the housing, but allow axial movement of the cage relative to the upper bearing carrier and the housing;

a plunger connector that connects the plunger to the connector members above the upper bearing carrier such that axial movement of the nonrotating member strokes the plunger;

a motor cooperatively engaged with the rotor for rotating the rotor; and reversing means for reversing a direction of rotation of the rotor at a top of the up stroke and at a bottom of the down stroke.

11. The assembly according to claim 10, further comprising a controller that supplies power to the motor, and wherein the reversing means comprises:
a timer selected to provide an estimated elapsed time for moving from the bottom of the down stroke to the top of the up stroke and for moving from the top of the upstroke to the bottom of the down stroke, and providing signals to the controller to reverse a direction of the motor.

12. The assembly according to claim 10, further comprising a controller that supplies power to the motor, and wherein the reversing means comprises:
an up stroke sensor mounted to the assembly that senses when the plunger nears the top of the up stroke;
a down stroke sensor mounted to the assembly that senses when the plunger nears the bottom of the down stroke; and
the up stroke and the down stroke sensors being in electrical communication with the controller to reverse a direction of the power being supplied to the motor upon receipt of a signal from the up stroke sensor and a signal from the down stroke sensor.

13. The assembly according to claim 10, wherein:
each of the connector members has an axial length greater than an axial length of the array of cage magnets.

14. The assembly according to claim 10, wherein:
the array of rotor magnets extends along a rotor helical line along the outer sidewall of the rotor, the rotor helical line having multiple turns encircling the outer sidewall, the turns of the rotor helical line being spaced apart from each other by a selected rotor magnet pitch; and the array of cage magnets extends along a cage helical line along the inner sidewall of the cage, the cage helical line having multiple turns encircling the inner sidewall, the turns of the cage helical line being spaced apart from each other by a cage magnet pitch that is the same as the rotor magnet pitch.

15. The assembly according to claim 14, wherein:
the array of rotor magnets comprises individual magnets mounted side by side along the rotor helical line; and
the array of cage magnets comprises individual magnets mounted side by side along the cage helical line.

16. A method of pumping fluid from a well, comprising:
providing a linear actuator with an axis, a rotating member having a cylindrical outer side wall containing an array of rotating member magnets, and a nonrotating member having a cylindrical inner side wall containing an array of nonrotating member magnets surrounding and spaced radially outward from the array of rotating member magnets, the rotating member magnets and the nonrotating member magnets being arranged so that magnetic fields of the rotating member magnets and nonrotating member magnets interact;

mounting the rotating member between upper and lower bearing carriers and placing the nonrotating member between the upper and lower bearing carriers, the upper bearing carrier having a plurality of openings radially outward from the axis;

connecting an upper end of the nonrotating member to a plurality of connector members that extend upward through the openings in the upper bearing carrier, and connecting upper ends of the connector members to a plunger rod extending downward from a plunger pump;

connecting the rotating member to an electrical motor;

lowering the linear actuator, the motor and the plunger pump into the well;

with the motor, rotating the rotating member, the connector members and the upper bearing carrier engaging to prevent the nonrotating member from rotating, which causes the nonrotating member to move axially relative to the rotating member and the plunger pump to move axially in unison to pump well fluid up the well; and reversing a direction of rotation of the rotating member at a top of an up stroke and at a bottom of a down stroke.

17. The method according to claim 16, wherein:
reversing the direction of the rotating member at the top of the up stroke and at the bottom of the down stroke of the plunger comprises:
estimating an elapsed time between the bottom of the down stroke and the top of the up stroke and estimating an elapsed time between the top of the up stroke and the bottom of the down stroke, and providing a signal to a controller to reverse a direction of the motor.

18. The method according to claim 16, wherein:
providing the linear actuator comprises directing the magnetic fields of the rotating member magnets outward relative to the axis; and
directing the magnetic fields of the nonrotating member magnets inward relative to the axis.

19. The method according to claim 16, wherein reversing the direction of the rotating member at the top of the up stroke and at the bottom of the down stroke of the plunger comprises:
with an up stroke sensor, sensing when the plunger nears the top of the up stroke;
with a down stroke sensor, sensing when the plunger nears the bottom of the down stroke; and sending signals from the up stroke and the down stroke sensors to a controller to reverse a direction of the power being supplied to the motor.

20. The method according to claim 16, wherein providing the linear actuator comprises:
extending the array of rotating member magnets along a helical line with multiple turns around the outer cylindrical wall of the rotating member;
extending the array of nonrotating member magnets along a helical line with multiple turns around the cylindrical inner wall of the nonrotating member, the number of turns of the helical line of the nonrotating member being less than the turns of the helical line around the rotating member; and
spacing the turns of the helical line around the nonrotating member apart from each other an equal distance to a distance between the turns of the helical line of the rotating member.

\* \* \* \* \*

UNITED STATES PATENT AND TRADEMARK OFFICE
CERTIFICATE OF CORRECTION

| | |
|---|---|
| PATENT NO. | : 9,726,166 B2 |
| APPLICATION NO. | : 14/566379 |
| DATED | : August 8, 2017 |
| INVENTOR(S) | : Steven K. Tetzlaff et al. |

It is certified that error appears in the above-identified patent and that said Letters Patent is hereby corrected as shown below:

In the Specification

Column 7, Line 10, between "may" and "connected", insert --be--.

Signed and Sealed this
Tenth Day of April, 2018

Andrei Iancu
*Director of the United States Patent and Trademark Office*